(12) United States Patent
Hattiangadi et al.

(10) Patent No.: US 11,125,122 B1
(45) Date of Patent: Sep. 21, 2021

(54) VALVE SEAT INSERT WITH SOFT LANDING INSERT DESIGN WITH CONTOURED RADII

(71) Applicant: Caterpillar Inc., Peoria, IL (US)

(72) Inventors: Ashwin A. Hattiangadi, Edwards, IL (US); Abram M. Ingold, Metamora, IL (US); Sanjay Kumar, Dunlap, IL (US); Adam D. Patrick, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/820,930

(22) Filed: Mar. 17, 2020

(51) Int. Cl.
| | | |
|---|---|---|
| *F01L 3/06* | (2006.01) | |
| *F02F 1/24* | (2006.01) | |
| *F01L 3/20* | (2006.01) | |
| *F01L 3/22* | (2006.01) | |

(52) U.S. Cl.
CPC .................. *F01L 3/06* (2013.01); *F01L 3/20* (2013.01); *F01L 3/22* (2013.01); *F02F 1/24* (2013.01); *F02F 2001/247* (2013.01)

(58) Field of Classification Search
CPC ....... F01L 3/06; F01L 1/24; F01L 3/22; F01L 3/12; F01L 3/14; F01L 3/16; F01L 3/18; F01L 3/20; F01L 2003/253; F02F 1/24; F02F 2001/247
See application file for complete search history.

(56) References Cited

U.S. PATENT DOCUMENTS

| | | | | |
|---|---|---|---|---|
| 4,728,078 A | * | 3/1988 | Oda | .......................... F01L 3/22 123/188.8 |
| 4,763,876 A | | 8/1988 | Oda et al. | |
| 5,762,320 A | | 6/1998 | Williams et al. | |
| 8,186,724 B2 | | 5/2012 | Kato et al. | |
| 2012/0266840 A1 | * | 10/2012 | Sakurai | ..................... F01L 3/22 123/193.2 |
| 2014/0083389 A1 | * | 3/2014 | Knob | ........................ F01L 3/20 123/193.3 |
| 2020/0291827 A1 | * | 9/2020 | Hattiangadi | .............. F01L 3/22 |

FOREIGN PATENT DOCUMENTS

| | | |
|---|---|---|
| CN | 201277069 Y | 7/2009 |
| CN | 205532754 U | 8/2016 |
| EP | 3000998 B1 | 7/2017 |

* cited by examiner

*Primary Examiner* — Syed O Hasan
(74) *Attorney, Agent, or Firm* — Law Office of Kurt J. Fugman LLC (57) ABSTRACT

A valve seat insert includes a top convex arcuate blend for improving fluid flow, and a valve seating surface for slowing down valve recession. The valve seating surface includes a radially outer convex arcuate segment defining an outer radius of curvature forming a first wear crown for contacting the valve at an early wear state, a radially inner convex arcuate segment defining an inner radius of curvature forming a second wear crown for contacting the valve at a later wear state, and a linear segment extending between the radially outer convex arcuate segment and the radially inner convex arcuate segment.

17 Claims, 9 Drawing Sheets

| LOAD CASES | BASELINE-CURRENT | CPRESS INTAKE ||||
| --- | --- | --- | --- | --- | --- |
| | | NEW OPTION 1 | OPTION 2 | OPTION 3 | OPTION 4 |
| ASSEMBLY | A | 54% of A | 68% of A | 85% of A | 82% of A |
| HOT | B | 65% of B | 86% of B | 71% of B | 110% of B |
| HOT+PCP | C | 49% of C | 57% of C | 64% of C | 68% of C |

| LOAD CASES | CPRESS EXHAUST | | | |
|---|---|---|---|---|
| | BASELINE-CURRENT | NEW OPTION 1 | NEW - OPTION 2 | OPTION 3 |
| ASSEMBLY | X | 61% of X | 53% of X | 81% of X |
| HOT | Y | 108% of Y | 89% of Y | 154% of Y |
| HOT+PCP | Z | 49% of Z | 44% of Z | 54% of Z |

*FIG. 15*

VALVE SEAT INSERT WITH SOFT LANDING INSERT DESIGN WITH CONTOURED RADII

TECHNICAL FIELD

The present disclosure relates generally to engine valves and associated hardware, and more particularly to a valve seat insert for an intake valve or an exhaust valve that are configured to provide a long life via a soft landing while not compromising other engine performances.

BACKGROUND

Gas exchange valves are used in internal combustion engines to control fluid connections between the cylinder and a supply of intake air or intake air and other gases such as recirculated exhaust gas, or between the cylinder and an exhaust manifold for expelling combustion products during operation. Designs are known wherein a single intake valve and a single exhaust valve are associated with each cylinder in an engine, as well as designs where multiple gas exchange valves of each respective type are associated with each cylinder. A camshaft, typically rotated at half engine speed, is coupled with valve lifters, bridges, rocker arms, and/or other equipment for controlling the opening and closing of gas exchange valves at appropriate engine timings.

Gas exchange valves are moved out of contact with and into contact with the engine head or a valve seat insert within the engine head to affect their opening and closing actions. Gas exchange valves may be moved between their open and closed positions with significant mechanical forces. The in-cylinder environment is associated with combustion temperatures of several hundred degrees along with relatively high pressures. These and other factors contribute to gas exchange valve operating conditions being quite harsh. It has been observed that gas exchange valves and valve seats or valve seat inserts can exhibit a phenomenon over time known as valve recession. Over the course of an engine's service life, or between service intervals, the contacts between a gas exchange valve and its valve seat can number in the millions or potentially even billions.

The harsh conditions and great number of impacts can cause material of which the gas exchange valve and/or the valve seat is formed to wear away and/or become deformed, so that the valve "recedes" toward or into the engine head further than what is desired. Where valve seat recession becomes severe enough engine operation or performance can be compromised, sometimes requiring a so-called top end overhaul prematurely. Engineers have experimented with a variety of different techniques attempting to ameliorate the extent and effects of valve seat recession and other valve wear patterns. A continuing challenge to attempt valve or valve seat redesign are the often-unpredictable effects that altered geometry has on gas flow or other operating characteristics. Gas flow patterns and/or efficiency can affect in-cylinder pressure and temperature, composition of a fuel and air mixture, or other parameters potentially impacting emissions reduction strategies, engine efficiency, heat dissipation or thermal fatigue, or still other parameters.

In certain types of engines, a high power density is desired. In such applications, such as a high power density C280 (diesel engine), G3600 (gas engine) or other marine engines manufactured by the Applicant of the present disclosure is considered by some to be an industry leaders for long top end life and durability. However, continuous improvement in this area is warranted.

U.S. Pat. No. 4,728,078A discloses a ceramic valve seat that has rounded edges to mitigate stress concentrations. However, this reference fails to disclose how to improve the longevity of a valve seat while also maintaining the other desired engine performances including fluid mechanics and power.

SUMMARY OF THE INVENTION

An engine head assembly according to an embodiment of the present disclosure for an internal combustion engine may comprise an engine head having a fluid conduit formed therein, a valve, a valve seat insert positioned at least partially within the engine head, and the valve seat insert including an at least partially annular body, defining a longitudinal axis, and a radial direction that is perpendicular to the longitudinal axis, a first axial end surface disposed proximate to the engine head, and a second axial end surface. The valve seat insert may further a radially inner surface forming a throat, a radially outer peripheral surface, and a valve seating surface disposed axially and radially between the radially inner surface and the second axial end surface. Also, a top convex arcuate blend may extend from the first axial end surface to the radially inner surface. In a plane containing the longitudinal axis and the radial direction, the valve seating surface may include a radially outer convex arcuate segment defining an outer radius of curvature forming a first wear crown for contacting the valve at an early wear state, a radially inner convex arcuate segment defining an inner radius of curvature forming a second wear crown for contacting the valve at a later wear state, and a linear segment extending between the radially outer convex arcuate segment and the radially inner convex arcuate segment.

A valve seat insert according to an embodiment of the present disclosure for a valve in an internal combustion engine may comprise an annular body defining a valve seat cylindrical axis, and a radial direction that is perpendicular to the valve seat cylindrical axis, a first axial end surface, and a second axial end surface. The annular body may further have a radially inner surface defining a throat, a radially outer peripheral surface, and a valve seating surface extending axially and radially between the radially inner surface and the second axial end surface. A top convex arcuate blend may extend from the first axial end surface to the radially inner surface. In a plane containing the valve seat cylindrical axis and the radial direction, a radially outer arcuate segment may form a first wear crown, a radially inner arcuate segment may form a second wear crown, and a linear segment may extend between the radially outer arcuate segment and the radially inner arcuate segment.

A valve seat insert according to another embodiment of the present disclosure for a valve in an internal combustion engine may comprise an annular body defining a valve seat cylindrical axis, and a radial direction that is perpendicular to the valve seat cylindrical axis, a first axial end surface, and a second axial end surface. The annular body may further have a radially inner surface defining a throat, a radially outer peripheral surface, and a valve seating surface extending between the radially inner surface and the second axial end surface. A top convex arcuate blend surface may extend from the first axial end surface to the radially inner surface. In a plane containing the valve seat cylindrical axis and the radial direction, a radially outer convex arcuate segment may form a first wear crown, a radially inner convex arcuate segment may form a second wear crown, a linear segment may extend axially and radially between the radially outer convex arcuate segment and the radially inner convex arcuate segment defining a break-in contact width that is greater than 3.9 millimeters, and the top convex arcuate blend surface may define a top radius of curvature that is greater than 0.3 millimeters.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or a prime indicator such as 100', 100" etc. It is to be understood that the use of letters or primes immediately after a reference number indicates that these features are similarly shaped and have similar function such as is often the case when geometry is mirrored about a plane of symmetry. For ease of explanation in this specification, letters or primes will often not be included herein but may be shown in the drawings to indicate duplications of features discussed within this written specification.

Figure 1:
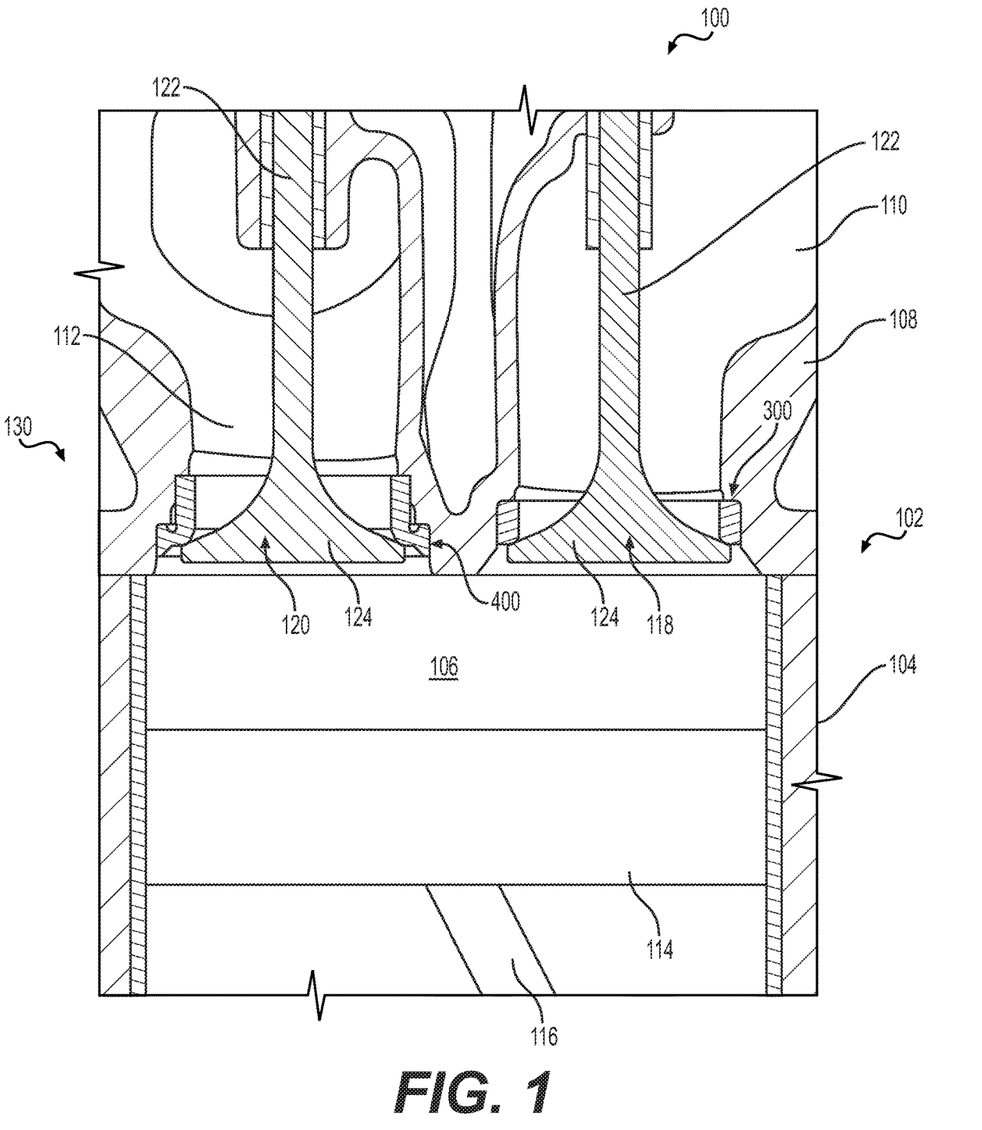
FIG. 1 is a sectioned side diagrammatic view of an internal combustion engine, according to a first embodiment of the present disclosure (e.g. a C280 diesel marine engine manufactured by the Applicant of the present disclosure).

Referring to FIG. 1, there is shown an internal combustion engine 100 according to one embodiment and including an engine housing 102 having a cylinder block 104 with a cylinder 106 (may also be referred to a "bore") formed therein. Internal combustion engine 100 could be any of a variety of engines including a compression ignition diesel engine, a spark-ignited gasoline engine, a gaseous fuel engine structured to operate on a fuel that is gaseous at standard temperature and pressure, a dual fuel engine, or still another. In a compression ignition diesel engine application, such as a direct-injected diesel engine, suitable fuels could include diesel distillate fuel, biodiesel, blends of these, or still others. For the embodiments discussed herein in particularity, the engine may be a high power density C280 engine or other marine engines manufactured by the Applicant of the present disclosure. Other applications are to be considered within the scope of the present disclosure.

Figure 2:
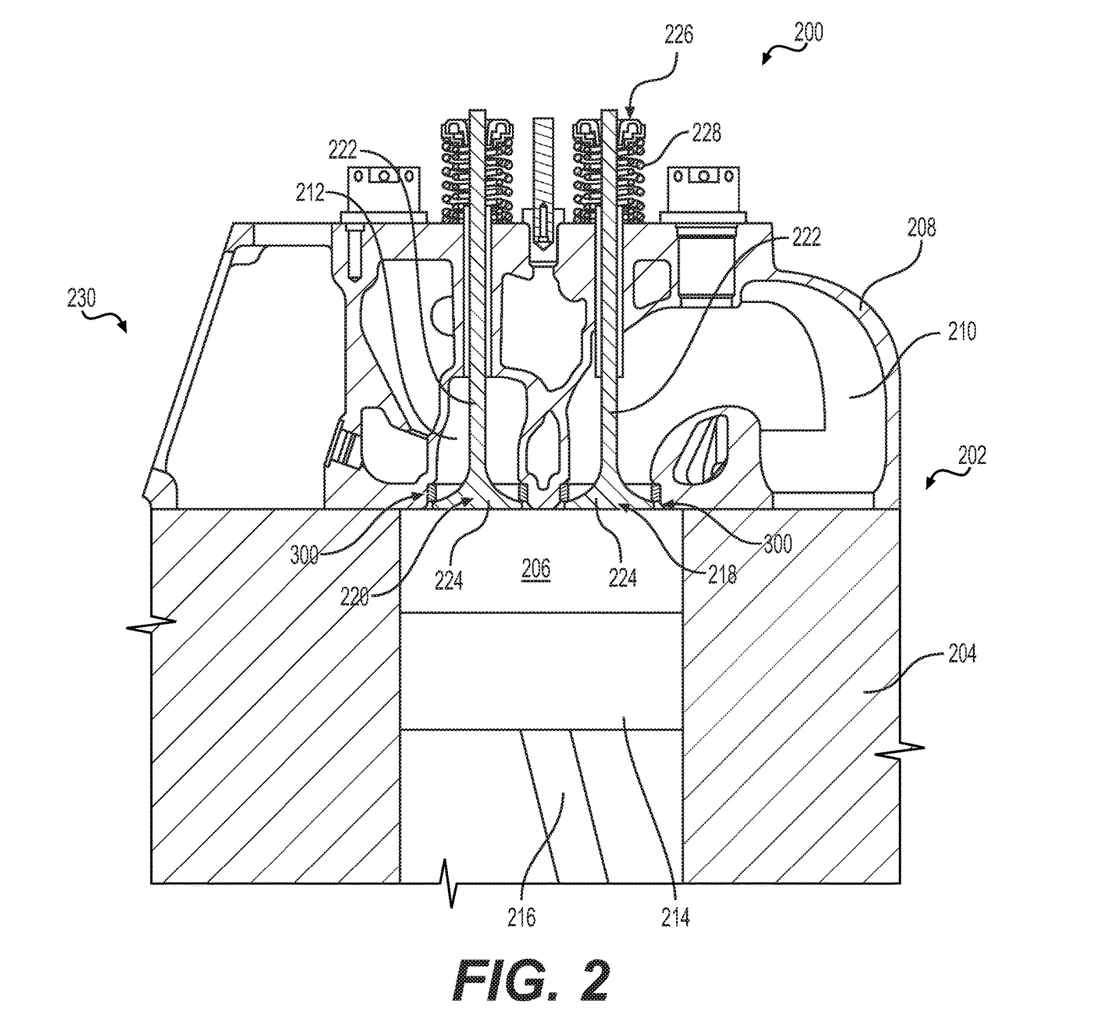
FIG. 2 is a sectioned side diagrammatic view of an internal combustion engine, according to a second embodiment of the present disclosure (e.g. a G3600 gas marine engine manufactured by the Applicant of the present disclosure).

Similarly, in FIG. 2, there is shown an internal combustion engine 200 according to another embodiment that has an engine housing 202 having a cylinder block 204 with a cylinder 206 (may also be referred to a "bore") formed therein. Internal combustion engine 200 could be any of a variety of engines including a compression ignition diesel engine, a spark-ignited gasoline engine, a gaseous fuel engine structured to operate on a fuel that is gaseous at standard temperature and pressure, a dual fuel engine, or still another. In a spark-ignited gasoline engine application, such as a direct-injected gas engine, suitable fuels could include gasoline, etc. For the embodiments discussed herein in particularity, the engine may be a high power density G3600 gas marine engine or other marine engines manufactured by the Applicant of the present disclosure. Other applications are to be considered within the scope of the present disclosure.

Looking at FIGS. 1 and 2 together, an engine head 108, 208 may be coupled to the cylinder block 104, 204 and has a first gas exchange conduit 110, 210 and a second gas exchange conduit 112, 212 formed therein. Gas exchange conduits 110, 210 and 112, 212 could each or either be an intake conduit structured to fluidly connect with an intake manifold or an exhaust conduit structured to connect with an exhaust manifold. In a practical implementation strategy, gas exchange conduit 110, 210 is an intake conduit and gas exchange conduit 112, 212 is an exhaust conduit.

A piston 114, 214 is movable within cylinder 106, 206 between a bottom dead center position and a top dead center position and is coupled to a crankshaft (not shown) by way of a connecting rod 116, 216 in a generally conventional manner. Engine 100, 200 could include any number of cylinders arranged in any suitable configuration such as a V configuration, an in line configuration, or still another. Engine head 108, 208 could include a monolithic engine head associated with all of a plurality of the cylinders in engine 100, 200, or could be one of a plurality of separate engine head sections each associated with less than all of the cylinders in engine 100, 200.

Engine 100, 200 further includes a first gas exchange valve 118, 218, which may include an intake valve, and a second gas exchange valve 120, 220, which may include an exhaust valve. Gas exchange valves 118, 218, 120, 220 including aspects of their structure and operation, is discussed herein in the singular, however, it will be understood that the description of gas exchange valve 118, 218, 120, 220 can apply by way of analogy to any other gas exchange valves within engines 100, 200, except where otherwise indicated. Gas exchange valves 118, 218, 120, 220 are shown more or less vertically oriented with respect to a direction of reciprocation of piston 114, 214, however, it should also be appreciated that other configurations such as gas exchange valves at diagonal orientations are contemplated herein. Gas exchange valves 118, 218, 120, 220 also include a shaft or stem 122, 222 connected to a valve head 124, 224.

As best seen in FIG. 2, a valve bridge 226 or the like may be coupled to gas exchange valve 218, 220 such that gas exchange valve 218, 220 can move together with another gas exchange valve (not shown) between open and closed positions, such as in response to rotation of a camshaft and movement of a rocker arm, a valve lifter assembly, and/or other equipment. A return spring 228 may be coupled with gas exchange valve 218, 220 in a generally conventional manner to bias the valve toward a closed position.

As seen in FIGS. 1 and 2, engine 100, 200 further includes an engine head assembly 130, 230 formed by engine head 108, 208 and a plurality of valve seat inserts 300 and 400 associated with gas exchange valves 118, 218, 120, 220. Gas exchange valves 118, 218, 120, 220 are movable between a closed valve position and an open valve position. At the closed valve position, gas exchange valves 118, 218, 120, 220 contact valve seat insert 300 or 400. At the closed position cylinder 106,206 is blocked from fluid communication with the corresponding gas exchange conduit 110, 112, 210, 212. At the open valve position fluid communication exists. A combustion face of the valves is oriented toward cylinder.

As will also be further apparent from the following description, valve seat inserts 300, 400, are structured, together with the corresponding gas exchange valves, to slow and alter the nature of valve recession over the course of a service life or service interval of engine 100, 200 and to provide intake gas flow properties at least as efficacious as, and potentially improved over, known designs.

Figure 3:
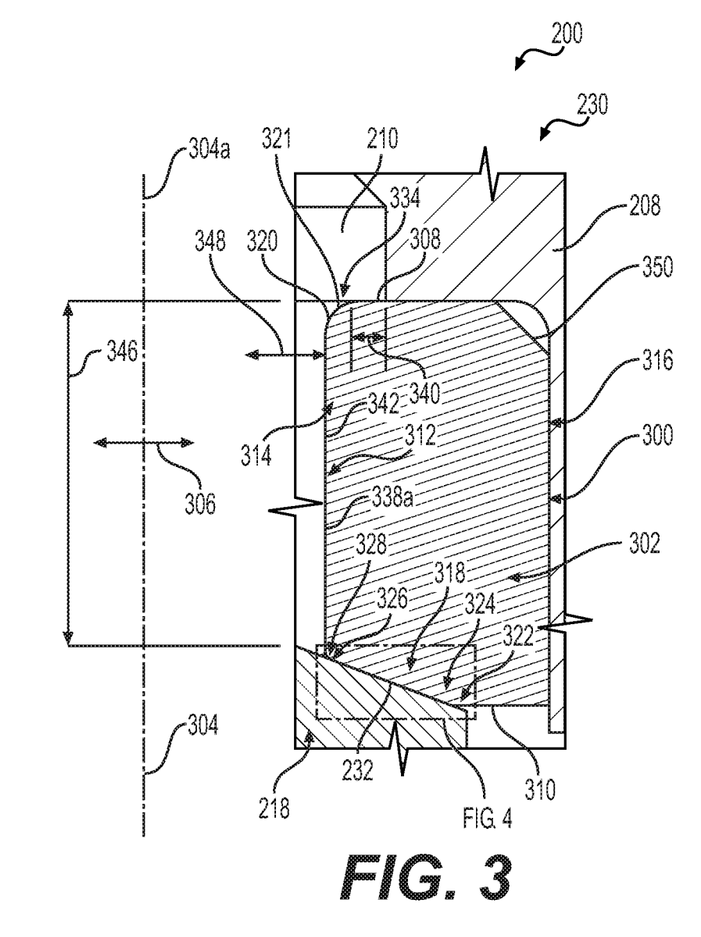
FIG. 3 is a sectioned side diagrammatic view of portions of a gas exchange (intake and/or exhaust) valve and valve seat insert, according to one embodiment of the present disclosure that may be used in the internal combustion engine of FIG. 1 or FIG. 2.

Turning now to FIG. 3, it may be understood that an engine head assembly 230 for an internal combustion engine 200 such as those described above may comprise an engine head 208 having a fluid conduit formed (e.g. see item 210) formed therein, a valve 218, and a valve seat insert 300 positioned at least partially within the engine head 208.

The valve seat insert 300 may include an at least partially annular body 302 (e.g. may be a body of revolution such that the geometry does not alter along a circumferential direction, this may not be the case in other embodiments), defining a longitudinal axis 304, and a radial direction 306 that is perpendicular the longitudinal axis 304, a first axial end surface 308 that is disposed proximate to the engine head 208, and a second axial end surface 310 facing toward the cylinder 206 (see FIG. 2). A radially inner surface 312 that may form a throat 314 may be provided, as well as a radially outer peripheral surface 316, and a valve seating surface 318 that is disposed axially and radially between the radially inner surface 312, and the second axial end surface 310. Also, a top convex arcuate blend 320 may extend from the first axial end surface 308 to the radially inner surface 312.

As used herein, "blend" includes any transitional geometry including radii, polynomials, splines, ellipses, etc. Also, "arcuate" includes any feature that is not straight, flat, or planar.

Figure 4:
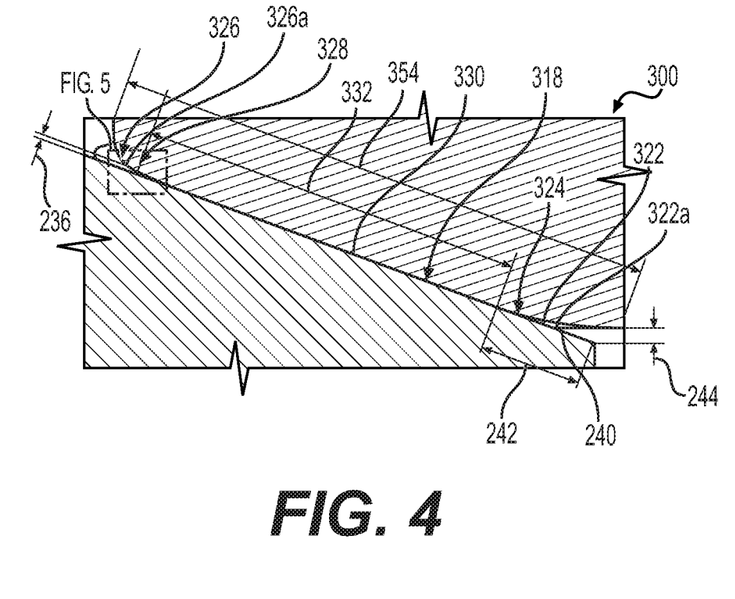
FIG. 4 is an enlarged detail view taken from rectangle 4 of FIG. 3.

In FIGS. 3 and 4, a cross-sectional plane is depicted that contains the longitudinal axis 304, and the radial direction 306. The valve seating surface 318 may include a radially outer convex arcuate segment 322 defining an outer radius of curvature forming a first wear crown 324 for contacting the valve at an early wear state, a radially inner convex arcuate segment 326 defining an inner radius of curvature forming a second wear crown 328 for contacting the valve at a later wear state, and a linear segment 330 extending between the radially outer convex arcuate segment 322 and the radially inner convex arcuate segment 326.

As best seen in FIG. 4, the linear segment 330 of the valve seating surface 318 defines a break-in contact width 332 that ranges from 4.0 millimeters to 5.0 millimeters, and more particularly 4.2 millimeters to 4.6 millimeters in some embodiments. Likewise, the outer radius of curvature may range from 1.5 millimeters to 6.0 millimeters, and the inner radius of curvature may range from 0.2 millimeters to 0.6 millimeter. Various other values for these variables are possible.

For example, the break-in contact width for embodiments referred to as "Option 1", "Option 2", "Option 3", and "Option 4" for an intake valve may be approximately 4.41 millimeters. The outer radius of curvature may be 5.4 millimeters (Option 1), 3.2 millimeters (Option 2), and 2.0 millimeters (Options 3 and 4). The inner radius of curvature may be 0.4 millimeters (Options 1, 2, 3 and 4).

In FIG. 3, it may be understood that the top convex arcuate blend 320 may form a top flow crown 334 having a top flow crown radius of curvature that ranges from 0.3 millimeters to 2.0 millimeters. For example, the top flow crown radius of curvature may be 1.5 millimeters (Options 1, 2, and 3), and 0.5 millimeters (Option 4, see FIG. 6).

Figure 6:
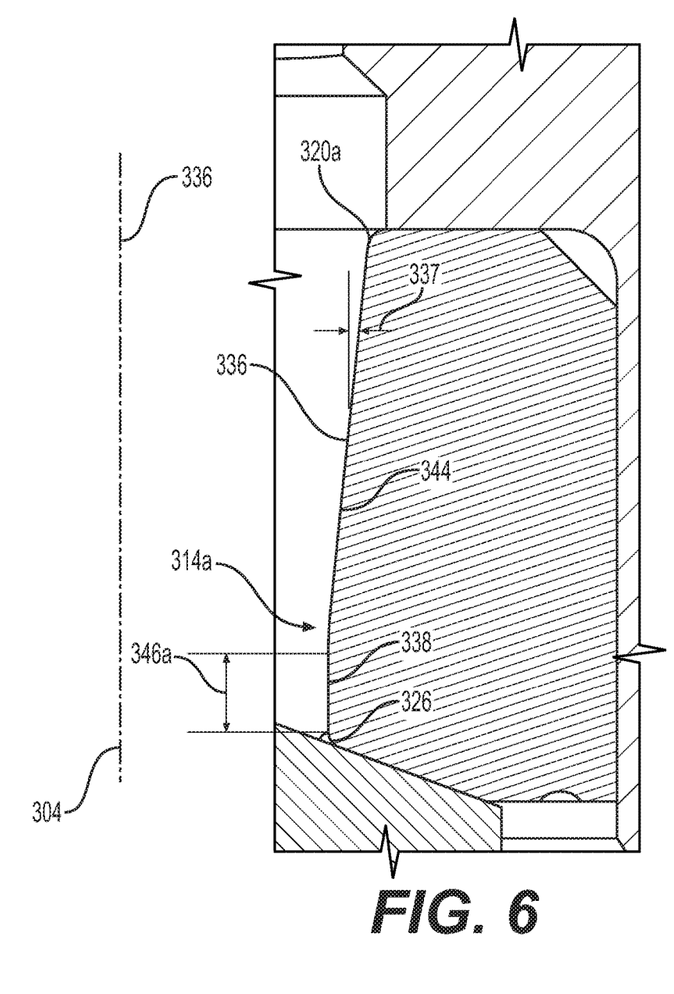
FIG. 6 is a sectioned side diagrammatic view of portions of a gas exchange (intake and/or exhaust) valve and valve seat insert, according to another embodiment of the present disclosure where the valve seat insert includes a conical surface that may provide a venturi effect for an intake valve or a diffuser effect for an exhaust valve that may be used in the internal combustion engine of FIG. 1 or FIG. 2.

Looking at FIG. 6, a conical surface 336 may extend from the top convex arcuate blend 320a to the throat 314a. The conical surface 336 may be configured to form a venturi to accelerate an incoming flow of gases to the cylinder in some embodiments. The conical surface 336 may form an acute angle 337 with the longitudinal axis 304 ranging from 0 degrees to 10.0 degrees in some embodiments (e.g. about 6.0 degrees). Also, the radially inner surface 312 may include a cylindrical surface 338 extending axially from the throat 314a to the radially inner convex arcuate segment 326.

Looking at FIG. 3, the top flow crown 334 is radially offset a radial distance 340 from the engine head 208, and the top convex arcuate blend 320 defines a top flow crown radius of curvature that is equal to or less than the radial distance 340 (may approach zero as shown in FIG. 6). Furthermore, the radially inner surface 312 may include a cylindrical surface 338a extending axially from the top convex arcuate blend 320 to the radially inner convex arcuate segment 326.

Referring now to FIGS. 2 and 3, the cylinder 206 is in fluid communication with the fluid conduit (e.g. 210, 212), and a piston 214 may be disposed in the cylinder 206 that is configured to translate upwardly and downwardly in the cylinder 206. The valve 210 may be disposed between the piston 214 and the valve seat insert 300. The valve 210 may include an upwardly facing shut off surface 232 that is configured to engage and disengage the valve seat insert 300. The upwardly facing shut off surface 232 may be conical as shown, planar, arcuate or any combination thereof.

The valve seat insert 300 that may be supplied as a replacement part according to an embodiment of the present disclosure will now be discussed with reference to FIGS. 3 and 4.

The valve seat insert 300 may have an annular body 302 defining a valve seat cylindrical axis 304a, and a radial direction 306 that is perpendicular to the valve seat cylindrical axis 304a, a first axial end surface 308, and a second axial end surface 310. The annular body 302 further include a radially inner surface 312 defining a throat 314, a radially outer peripheral surface 316, and a valve seating surface 318 extending axially and radially between the radially inner surface 312, and the second axial end surface 310. A top convex arcuate blend 320 may extend from the first axial end surface 308 to the radially inner surface 312.

In a plane (such as shown in FIGS. 3 and 4) containing the valve seat cylindrical axis 304a, and the radial direction 306, a radially outer arcuate segment 322a may form a first wear crown 324, a radially inner arcuate segment 326a may form a second wear crown 328, and a linear segment 330 may extend between the radially outer arcuate segment 322a, and the radially inner arcuate segment 326a. A vertical segment 342 may be interposed axially between the first axial end surface 308, and the second axial end surface 310.

As shown in FIG. 6, a sloping segment 344 may extend between the top convex arcuate blend 320a, and the throat 314a. In such a case, the sloping segment 344 may extend radially outwardly from the throat 314a toward the top convex arcuate blend 320a at an acute angle 337 of 3.0° or greater, relative to the valve seat cylindrical axis 304a, such that the radially inner surface 312a forms a venturi to accelerate an incoming flow of gases in an intake valve type application.

As alluded to above herein with reference to FIGS. 3 and 4, the top convex arcuate blend 320 may define a top blend radius of curvature that ranges from 0.4 millimeters to 2.0 millimeters, the radially outer arcuate segment 322a may define an outer radius of curvature that ranges from 1.5 millimeters to 6.0 millimeters, the radially inner arcuate segment 326a may define an inner radius of curvature that ranges from 0.2 millimeters to 0.6 millimeters, and the linear segment 330 of the valve seating surface 318 may define a break-in contact width 332 that ranges from 4.0 millimeters to 5.0 millimeters.

Next, a valve seat insert 300 that may also be used as a replacement part according to another embodiment of the present disclosure will now be discussed with reference to FIGS. 3 and 4.

In a plane containing the valve seat cylindrical axis 304a, and the radial direction 306 such as shown in FIGS. 3 and 4, the valve seating surface 318 may have a radially outer convex arcuate segment 322 forming a first wear crown 324, a radially inner convex arcuate segment 326 forming a second wear crown 328, a linear segment 330 extending axially and radially between the radially outer convex arcuate segment 322, and the radially inner convex arcuate segment 326 may define a break-in contact width 322 that is greater than 3.9 millimeters. Also, the top convex arcuate blend surface 321 may define a top radius of curvature that is greater than 0.3 millimeters.

Similarly, the radially outer convex arcuate segment 322 may define a radially outer convex radius of curvature that is greater than 1.9 millimeters, and the radially inner convex arcuate segment 326 may define a radially inner convex radius of curvature that is greater than 0.2 millimeters.

In FIG. 3, a vertical segment 342 may extend from the top convex arcuate blend surface 321 to the radially inner convex arcuate segment 326, defining a vertical length 346 that ranges from 13.5 millimeters to 14.5 millimeters. Also, the throat 314 defines a throat diameter 348 that ranges from 78.0 millimeters to 79.6 millimeters in some embodiments.

In FIG. 6, a vertical segment 342a extends from the throat 314a to the radially inner convex arcuate segment 326, defining a vertical length 346a that ranges from 2.0 millimeters to 3.0 millimeters, and a sloping segment 344 that extends from the throat 314a to the top convex arcuate blend surface 321.

As further discussed herein with reference to FIGS. 3 thru 6, the valve seat insert 300 may have a proportionally larger valve seating surface area than certain prior designs, and somewhat less available flow area for gas exchange, with the improved venturi-accelerated flow compensating for, or more than compensating for, what might otherwise be expected to be reduced performance.

The radially outer peripheral surface 316 has a cylindrical shape and may be located at a uniform distance from valve seat cylindrical axis 304a. In an implementation, valve seat insert 300 is "dry," meaning that no additional cooling by way of engine coolant or the like is employed. The radially outer peripheral surface 316 may be uninterrupted in abutment against engine head 208, such that when valve seat insert 300 is positioned within engine head 208 for service, such as by way of an interference fit, there is no backside cooling void, or other cavity formed that provides liquid cooling to valve seat insert 300. A chamfer 350 may extend between the radially outer peripheral surface 316, and the first axial end surface 308. Similar statements may be made with respect to an exhaust valve application.

Initial contact when valve seat insert 300 and gas exchange valve 218 are first placed in service may occur at a contact band at the first wear crown 324. As the respective components deform and wear they may transition from an early wear state where the components have a line contact, or nearly line contact, band formed at the first wear crown 324, to full face contact, and a still later wear state where full face contact is maintained but transitions also to contact with the second wear crown 328. It should be appreciated that the term "early wear state" and the term "later wear state" are used herein in relation to one another, not necessarily meaning that "early" contemplates new nor that "later" contemplates old, although such terms could apply in an actual case. Certain basic principles illustrated relative to profiling of valve seating surface 318 have application to a number of different embodiments, some having additional or alternative structural details, as further discussed herein.

Figure 5:
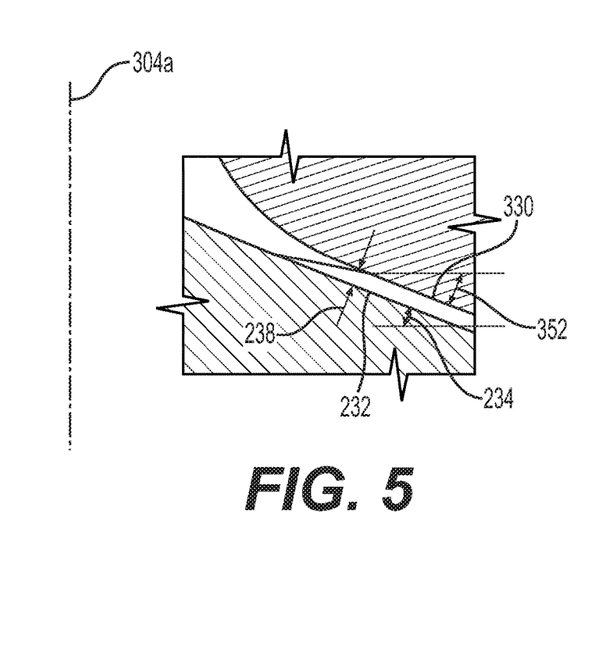
FIG. 5 is an enlarged detail view taken from rectangle 5 of FIG. 4.

In the illustrations of FIGS. 4 and 5, it can also be seen that the shut off surface 232 is oriented at a valve angle 234 relative to a horizontal plane that is oriented normal to valve seat cylindrical axis 304a. Linear segment 330 is oriented at a seat angle 352 relative to the horizontal plane that is larger than valve angle 234. Thus, an interference angle 236 is formed by the shut off surface 232 and the linear segment 330, and a clearance 238 (ranging from 0.018 mm to 0.025 mm) is formed between the shut off surface 232 and the linear segment 330. The valve angle 234 may differ from the seat angle 352 by about 0.2° to about 0.3° (e.g. about 0.25°). Seat angle 352 may be from about 15° to about 25°, and seat angle 352 may be about 20° in one practical implementation. As used herein, the term "about" should be understood in the context of conventional rounding to a consistent number of significant digits. Accordingly, "about 20" means from 19.5 to 20.4, "about 19.5" means from 19.45 to 19.54, and so on.

A second clearance 240 may be formed between the shut off surface 232 and the radially outer convex arcuate segment 322 and extends radially outward and axially outward from a contact band formed at the early wear state approximately as depicted, at the first wear crown 324. It will be recalled that the initial contact band may have an annular form and may be substantially a line contact pattern but expected to commence changing toward a face contact pattern as early break-in occurs. A size of the second clearance 240 may include a facing length 242 that is about 0.80 millimeter to about 1.6 millimeters (e.g. about 1.528 millimeters for Option 1, about 1.13 millimeters for Option 2, about 0.913 millimeter for Option 3, about 0.926 millimeter for Option 4), between the shut off surface 232 and the radially outer convex arcuate segment 322. Facing length 242 can be understood as the distance from the contact band to an outer edge of the upwardly facing shut off surface 232 of the valve head 224. A maximum vertical clearance dimension 244 is also shown to range from 0.190 millimeter to 0.210 millimeter (about 0.206 millimeter for Option 1, 0.189 millimeter for Options 2, 3, and 4).

Also shown in FIG. 4 is a full seating width dimension 354 or theoretical full seating width of valve seat insert 300 that may eventually become available as wear between the components progresses, in comparison to a break-in face contact width obtained when full face contact initially occurs. The full seating width dimension 354 may range from 5.4 millimeters to 6.9 millimeters (about 6.68 millimeters for Option 1, about 5.91 millimeters for Option 2, about 5.48 millimeters for Option 3, about 5.49 millimeters for Option 4).

Any of the aforementioned features may be differently configured or have different dimensions that what has been specifically stated herein.

Figure 7:
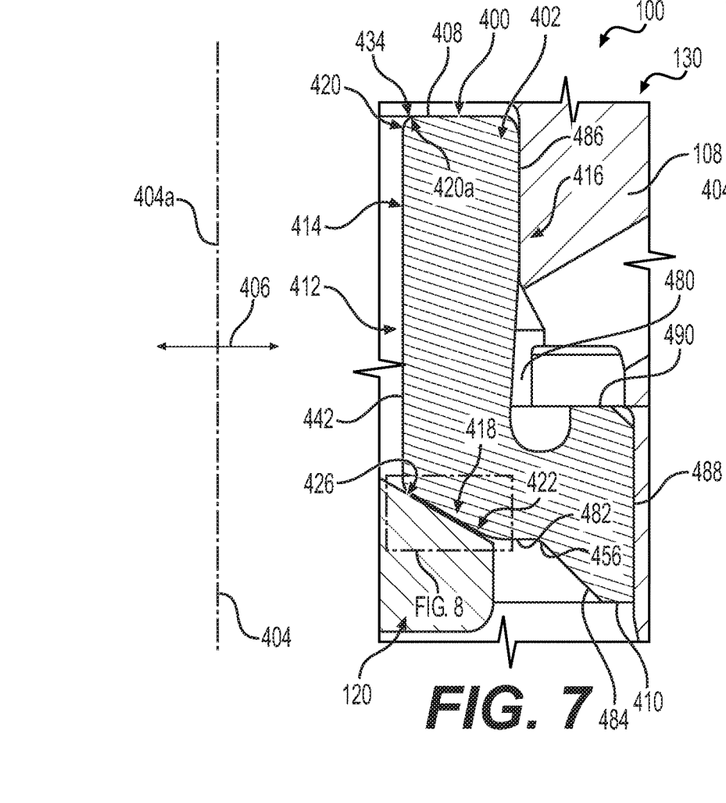
FIG. 7 is a sectioned side diagrammatic view of portions of a gas exchange (e.g. exhaust) valve and valve seat insert, according to yet another embodiment of the present disclosure that may be used in the internal combustion engine of FIG. 1 or FIG. 2.

Turning now to FIG. 7, it may understood that an engine head assembly 130 for an internal combustion engine 100 may comprise an engine head 108 having a fluid conduit formed therein (e.g. see 112), a valve 120, and a valve seat insert 400 positioned at least partially within the engine head 108.

The valve seat insert 400 may include an at least partially annular body 402 defining a longitudinal axis 404, and a radial direction 406 that is perpendicular the longitudinal axis 404. A first axial end surface 408 may be disposed proximate to the engine head 108, and a second axial end surface 410 may face toward the cylinder 106 (see FIG. 1).

The valve seat insert 400 may also have a radially inner surface 412 forming a throat 414, a radially outer peripheral surface 416 defining a cooling gallery 480 (e.g. to cool the insert when exposed to exhaust gases in an exhaust valve application), and a valve seating surface 418 disposed axially and radially between the radially inner surface 412, and the second axial end surface 410. Also, a top convex arcuate blend 420 may extend from the first axial end surface 408 to the radially inner surface 412, defining a top flow crown 434.

Figure 8:
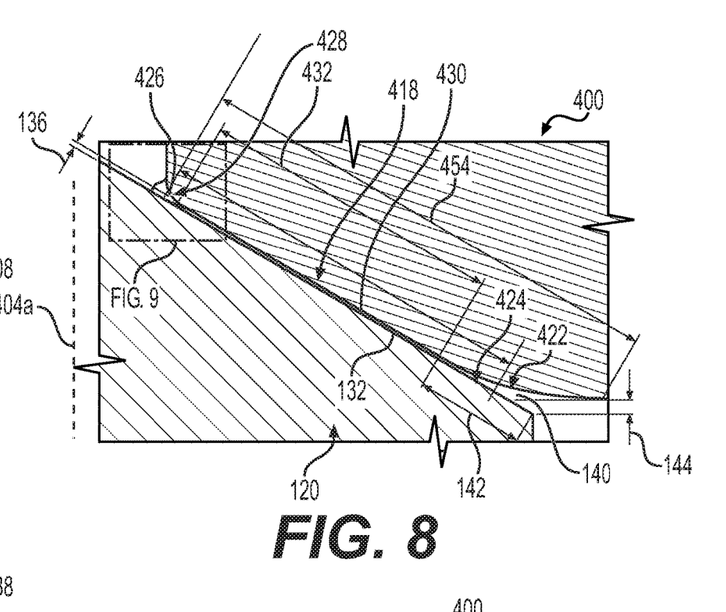
FIG. 8 is an enlarged detail view taken from rectangle 8 of FIG. 7.

FIGS. 7 and 8 illustrate a cross-sectional plane containing the longitudinal axis 404, and the radial direction 406 In that plane, the valve seating surface 418 may include a radially outer convex arcuate segment 422 defining an outer radius of curvature forming a first wear crown 424 for contacting the valve 120 at an early wear state, a radially inner convex arcuate segment 426 defining an inner radius of curvature forming a second wear crown 428 for contacting the valve 120 at a later wear state, and a linear segment 430 extending between the radially outer convex arcuate segment 422, and the radially inner convex arcuate segment 426.

As best seen in FIG. 7, the valve seat insert 400 may further comprise a lower planar shelf surface 482 that is disposed radially and axially adjacent the valve seating surface 418, and a radially outer conical surface 484 disposed radially and axially between the lower planar shelf surface 482, and the second axial end surface 410.

The radially outer peripheral surface 416 may include a radially inner cylindrical surface 486 extending from the first axial end surface 408, a radially outer cylindrical surface 488 extending from the second axial end surface 410, and an upper planar shelf surface 490 that is interposed radially and axially between the radially inner cylindrical surface 486, and the radially outer cylindrical surface 488. The cooling gallery 480 may extend from the upper planar shelf surface 490, and the radially inner cylindrical surface 486.

Figure 10:
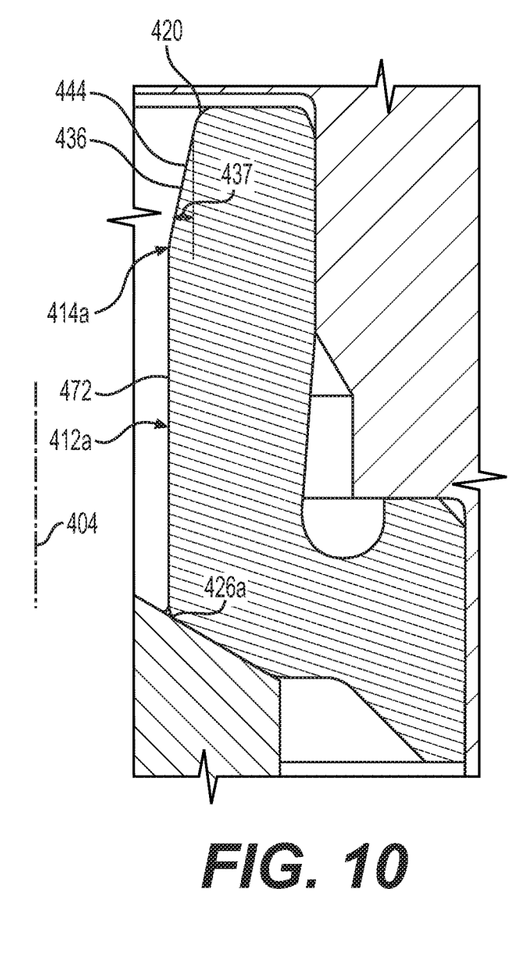
FIG. 10 is a sectioned side diagrammatic view of portions of a gas exchange (exhaust) valve and valve seat insert, according to another embodiment of the present disclosure similar to that of FIG. 7 where the valve seat insert includes a conical surface that may provide a diffuser effect for an exhaust valve that may be used in the internal combustion engine of FIG. 1 or FIG. 2.
Figure 11:
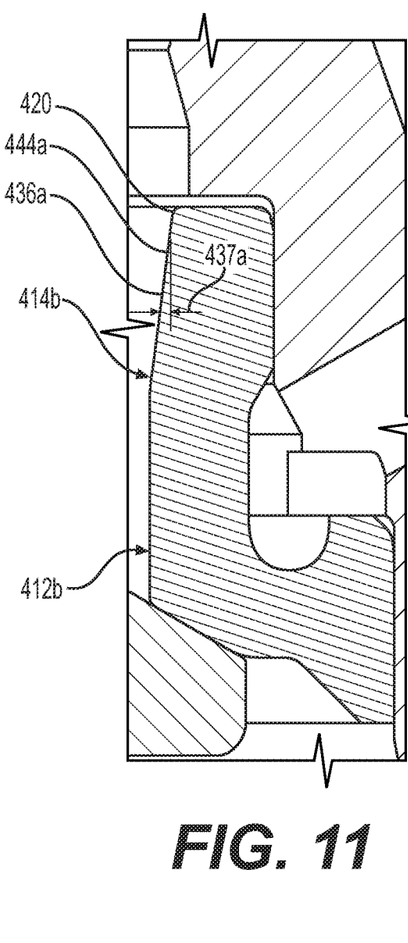
FIG. 11 is a sectioned side diagrammatic view of portions of a gas exchange (exhaust) valve and valve seat insert, according to another embodiment of the present disclosure similar to that of FIG. 10 where the valve seat insert includes modified geometry for the cooling gallery that may be used in the internal combustion engine of FIG. 1 or FIG. 2.

Looking now at FIGS. 10 and 11, a radially inner conical surface 436, 436a may extend from the top convex arcuate blend 420 to the throat 414. This radially inner conical surface 436, 436a may be configured to form a diffuser to decelerate an outgoing flow of gases. In such a case, the radially inner conical surface 436, 436a may form an acute angle 437, 437a with the longitudinal axis 404 ranging from 5.0 degrees to 15.0 degrees (e.g. about 7.125 degrees for Option 4 for the exhaust application in FIG. 11, about 12.0 degrees for Option 3 for the exhaust application in FIG. 10).

Referring back to FIG. 8, the linear segment 430 of the valve seating surface 418 may define a break-in contact width 432 that ranges from 4.5 millimeters to 5.0 millimeters (e.g. 4.9 millimeters for Option 1, 4.88 millimeters for Option 2, 5.12 millimeters for Option 3, 4.826 millimeters for Option 4, 4.655 millimeters for Options 6 and 7).

Likewise, the top convex arcuate blend 420 (see FIG. 7) forms a top flow crown 434 having a the top flow crown radius of curvature that ranges from 0.3 millimeter to 1.5 millimeters (e.g. 1.0 millimeter for Options 1 thru 3, 0.5 millimeters for Options 4 thru 7), the outer radius of curvature of 422 (see FIG. 8) ranges from 1.5 millimeters to 6.0 millimeters (e.g. 3.2 millimeters for Option 1, 5.4 millimeters for Options 2, 4, 6, 7, 2.0 millimeters for Option 3), and the inner radius of curvature of 426 (see FIG. 8) ranges from 0.2 millimeter to 1.0 millimeter (e.g. 0.4 millimeter for Option 2, 0.6 millimeter for Option 3, 0.5 millimeter for Options 4 and 7, 0.8 millimeter for Option 6).

Figure 12:
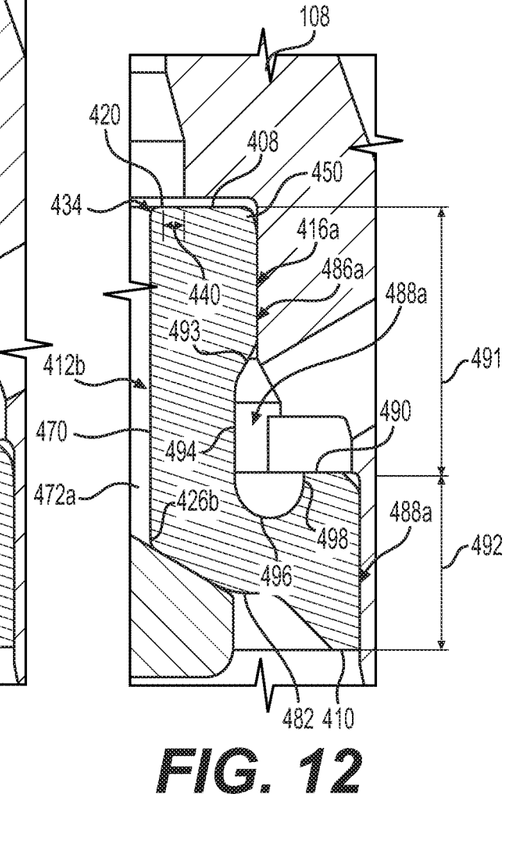
FIG. 12 is a sectioned side diagrammatic view of portions of a gas exchange (exhaust) valve and valve seat insert, according to another embodiment of the present disclosure similar to that of FIG. 11 where the valve seat insert lacks the slanted surface that may be used in the internal combustion engine of FIG. 1 or FIG. 2.

As best seen in FIG. 12, the top flow crown 434 may be radially offset a radial distance 440 from the engine head 108, and the top convex arcuate blend 420 defines a top flow crown radius of curvature that is equal to or greater than the radial distance 440. This may not the case for all embodiments (e.g. see FIG. 10).

With continued reference to FIG. 12, the radially inner surface 412 may include a radially inner cylindrical surface 470 that extends axially from the top convex arcuate blend 420 to the radially inner convex arcuate segment 426.

In FIGS. 10 and 12, the radially inner surface 412a, 412b may include a cylindrical surface 472, 472a extending axially from the throat 414a, 414b to the radially inner convex arcuate segment 426a, 426b.

The valve seat insert 400 that may be supplied as a replacement part according to an embodiment of the present disclosure will now be discussed with reference to FIGS. 7 and 8.

The valve seat insert 400 may comprise an annular body 402 defining a valve seat cylindrical axis 404a, and a radial direction 406 that is perpendicular to the valve seat cylindrical axis 404a. A first axial end surface 408, and a second axial end surface 410 may be disposed along the axis 404a.

The annular body 402 may further have a radially inner surface 412 defining a throat 414, a radially outer peripheral surface 416 defining a cooling gallery 480, and a valve seating surface 418 that extends between the radially inner surface 412, and the second axial end surface 410. A top convex arcuate blend 420 may extend from the first axial end surface 408 to the radially inner surface 412.

In the plane of FIGS. 7 and 8, it may be understood that a radially outer convex arcuate segment 422 forming a first wear crown 424, a radially inner convex arcuate segment 426 forming a second wear crown 428, and a linear segment 430 extending between the radially outer arcuate segment 422, and the radially inner convex arcuate segment 426 may be provided. Also, a vertical segment 442 may be interposed axially between the first axial end surface 408, and the second axial end surface 410.

In addition as seen in FIGS. 10 and 11, the radially inner surface 412 may include a sloping segment 444, 444a that may extend between the top convex arcuate blend 420 and the throat 414a, 414b. In such an embodiment, the sloping segment 444, 444a may extend radially outwardly from the throat 414a, 414b toward the top convex arcuate blend 420 at an acute angle 437, 437a of 5.0° such that the radially inner surface 412a, 412b forms a diffuser to decelerate an outgoing flow of gases.

As alluded to earlier herein with reference to FIG. 8, the top convex arcuate blend 420 may define a top blend radius of curvature that ranges from 0.3 millimeters to 1.5 millimeters, the radially outer convex arcuate segment 422 may define an outer radius of curvature that ranges from 1.5 millimeters to 6.0 millimeters, the radially inner convex arcuate segment 426 may define an inner radius of curvature that ranges from 0.2 millimeters to 1.0 millimeters, and the linear segment 430 of the valve seating surface 418 may define a break-in contact width 432 that ranges from 4.5 millimeters to about 5.5 millimeters.

Next, a valve seat insert 400 that may also be used as a replacement part according to yet another embodiment of the present disclosure will now be discussed starting with FIGS. 7 and 8.

The valve seat insert 400 may include a top convex arcuate blend surface 420a may extend from the first axial end surface 408 to the radially inner surface 412. A radially outer convex arcuate segment 422 forming a first wear crown 424, and a radially inner convex arcuate segment 426 forming a second wear crown 428 may also be provided. A linear segment 430 may extend between the radially outer convex arcuate segment 422, and the radially inner convex arcuate segment 426, defining a break-in contact width 432 that is greater than 4.5 millimeters. The top convex arcuate blend surface 420a may define a top radius of curvature that is greater than 0.3 millimeters in some embodiments.

In some embodiments, the radially outer convex arcuate segment 422 may define a radially outer convex radius of curvature that is greater than 1.5 millimeters, and the radially inner convex arcuate segment 426 may define a radially inner convex radius of curvature that is greater than 0.2 millimeters.

The valve seat insert 400 may further comprise a lower planar shelf surface 482 that is disposed radially and axially adjacent the valve seating surface 418, and a radially outer conical surface 484 that is disposed radially and axially between the lower planar shelf surface 482, and the second axial end surface 410.

In FIG. 12, it can be seen that the radially outer peripheral surface 416a includes a radially inner cylindrical surface 486a extending from the first axial end surface 408, a radially outer cylindrical surface 488a extending from the second axial end surface 410, and an upper planar shelf surface 490 that is interposed radially and axially between the radially inner cylindrical surface 486a, and the radially outer cylindrical surface 488a. The cooling gallery 480a may extend from the upper planar shelf surface 490, and the radially inner cylindrical surface 486a.

The first axial end surface 408 may be spaced away from the upper planar shelf surface 490 a first axial distance 491 that ranges from 18.5 millimeters to 20.0 millimeters (e.g. 19.25 millimeters), while the second axial end surface 410 may be spaced away from the upper planar shelf surface a second axial distance 492 that ranges from 12.0 millimeters to 14.0 millimeters (e.g. 13.0 millimeters)

In the plane of FIG. 12, it can be understood that the cooling gallery 480a may be defined by an upper slanted segment 493 that extends radially inwardly and axially downwardly to a straight axially extending segment 494 that extends axially downwardly to a semicircular segment 496 that extends radially outwardly to an axially upwardly extending segment 498 that connects to the upper planar shelf surface 490. The radius of curvature of 496 may be about 2.5 millimeters, the cooling gallery 480a may be spaced away from the first axial end surface 408 about 9.0 millimeters, and the lower planar shelf surface 482 may be spaced away from the second axial end surface 410 about 13.0 millimeters in certain embodiments. Also, the throat diameter of the valve seat insert 400 may be similar to or the same as that of the valve seat insert 300 as discussed earlier herein.

As further discussed herein with reference to FIGS. 7 thru 12, the valve seat insert 400 may have a proportionally larger valve seating surface area than certain prior designs, and somewhat less available flow area for gas exchange, with the improved venturi-accelerated flow provided by radially outer conical surface 484 compensating for, or more than compensating for, what might otherwise be expected to be reduced performance.

In an implementation, valve seat insert 400 is "wet", meaning that additional cooling by way of engine coolant or the like is employed. The valve seat insert 400 is positioned within engine head 108 for service, such as by way of an interference fit, and there is a backside cooling void (or cooling gallery 480, 480a), or other cavity formed that provides liquid cooling to valve seat insert 400. A chamfer 450 may extend between the radially outer peripheral surface 416, and the first axial end surface 408. Similar statements may be made with respect to an intake valve application.

Initial contact when valve seat insert 400 and gas exchange valve 120 are first placed in service may occur at a contact band at the first wear crown 424. As the respective components deform and wear they may transition from an early wear state where the components have a line contact, or nearly line contact, band formed at the first wear crown 424, to full face contact, and a still later wear state where full face contact is maintained but transitions also to contact with the second wear crown 428. It should be appreciated that the term "early wear state" and the term "later wear state" are used herein in relation to one another, not necessarily meaning that "early" contemplates new nor that "later" contemplates old, although such terms could apply in an actual case. Certain basic principles illustrated relative to profiling of valve seating surface 418 have application to a number of different embodiments, some having additional or alternative structural details, as further discussed herein.

Figure 9:
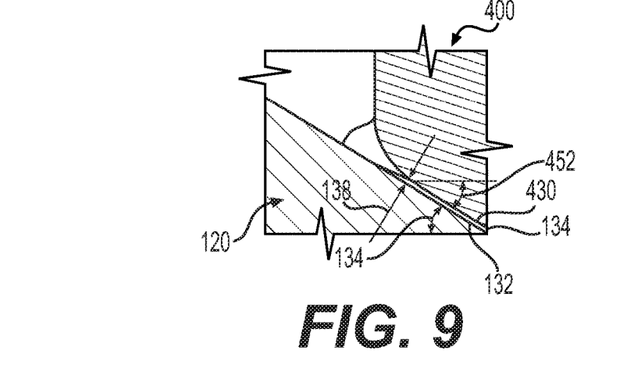
FIG. 9 is an enlarged detail view taken from rectangle 9 of FIG. 8.

In the illustrations of FIGS. 8 and 9, it can also be seen that the shut off surface 132 is oriented at a valve angle 134 relative to a horizontal plane that is oriented normal to valve seat cylindrical axis 404a. Linear segment 430 is oriented at a seat angle 452 relative to the horizontal plane that is larger than valve angle 134. Thus, an interference angle 136 is formed by the shut off surface 132 and the linear segment 430, and a clearance 138 (ranging from 0.04 mm to 0.045 mm) is formed between the shut off surface 132 and the linear segment 430. The valve angle 134 may differ from the seat angle 452 by about 0.4° to about 0.6° (e.g. about 0.5°). Seat angle 452 may be from about 25° to about 35°, and seat angle 452 may be about 30° in one practical implementation. As used herein, the term "about" should be understood in the context of conventional rounding to a consistent number of significant digits. Accordingly, "about 20" means from 19.5 to 20.4, "about 19.5" means from 19.45 to 19.54, and so on.

A second clearance 140 may be formed between the shut off surface 132 and the radially outer convex arcuate segment 422 that extends radially outward and axially outward from a contact band formed at the early wear state approximately as depicted, at the first wear crown 424. It will be recalled that the initial contact band may have an annular form and may be substantially a line contact pattern but expected to commence changing toward a face contact pattern as early break-in occurs. A size of the second clearance 140 may include a facing length 142 that is about 0.80 millimeter to about 2.0 millimeters (e.g. about 1.25 millimeters for Option 1, about 1.86 millimeters for Options 2 and 7, about 0.931 millimeter for Option 3, about 0.861 millimeter for Options 4, 6), between the shut off surface 132 and the radially outer convex arcuate segment 422. Facing length 142 can be understood as the distance from the contact band to an outer edge of the upwardly facing shut off surface 132 of the valve head 124. A maximum vertical clearance dimension 144 is also shown to range from 0.180 millimeter to 0.250 millimeter (about 0.229 millimeter for Option 1, 0.179 millimeter for Option 2, 0.198 millimeter for Option 3, 0.179 millimeter for Options 4, 6 and 7).

Also shown in FIG. 8 is a full seating width dimension 454 or theoretical full seating width of valve seat insert 400 that may eventually become available as wear between the components progresses, in comparison to a break-in face contact width obtained when full face contact initially occurs. The full seating width dimension 454 may range from 6.5 millimeters to 8.5 millimeters (about 6.89 millimeters for Option 1, about 8.0 millimeters for Option 2, about 6.6 millimeters for Option 3, about 7.117 millimeters for Options 4 and 6, about 6.941 millimeters for Option 7). A concave blend 456 may connect the lower planar shelf surface 482 and the radially outer conical surface 484 that may range from about 2.0 millimeters to about 3.0 millimeters ins some embodiments (see FIG. 7).

Any of the aforementioned features may be differently configured or have different dimensions that what has been specifically stated herein. Any of the valve seat inserts discussed herein may be cast, machined and formed of a steel such as a high-alloy hardened steel or tool steel.

INDUSTRIAL APPLICABILITY

In practice, a machine, an engine used by the machine, a valve seat insert, a valve, and/or any combination of these various assemblies and components may be manufactured, bought, or sold to retrofit a machine, or an engine already in the field in an aftermarket context, or alternatively, may be manufactured, bought, sold or otherwise obtained in an OEM (original equipment manufacturer) context.

As alluded to previously herein, the aforementioned embodiments may increase the life of the valve seat insert and/or valve while maintaining or even improving engine performance(s) as will be elaborated further herein momentarily.

Figure 13:
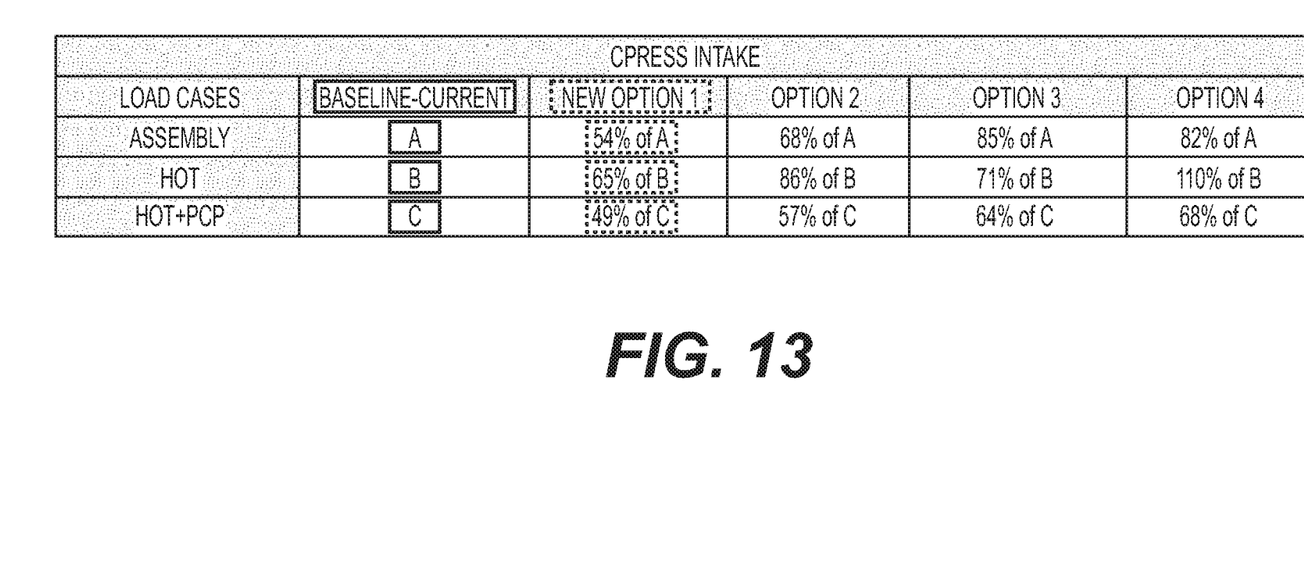
FIG. 13 is a comparative table of a valve seat insert in an engine head in proximity to an intake valve, according to various embodiments and principles of the present disclosure such as those shown FIGS. 3 thru 6, in comparison with a previous design to show reduced contact pressures.

Referring now to FIG. 13, there is a comparative table showing how the embodiments (e.g. Options 1 thru 4) of the present disclosure for an intake valve have reduced the contact pressures (stresses) by as much as 40% or more compared to previous designs (Baseline). This may be due to increased contact area between the valve and the valve seat. So, one skilled in the art would expect that various embodiments of the present disclosure will have an improved longevity, necessitating less maintenance over the life of the engine.

Figure 14:
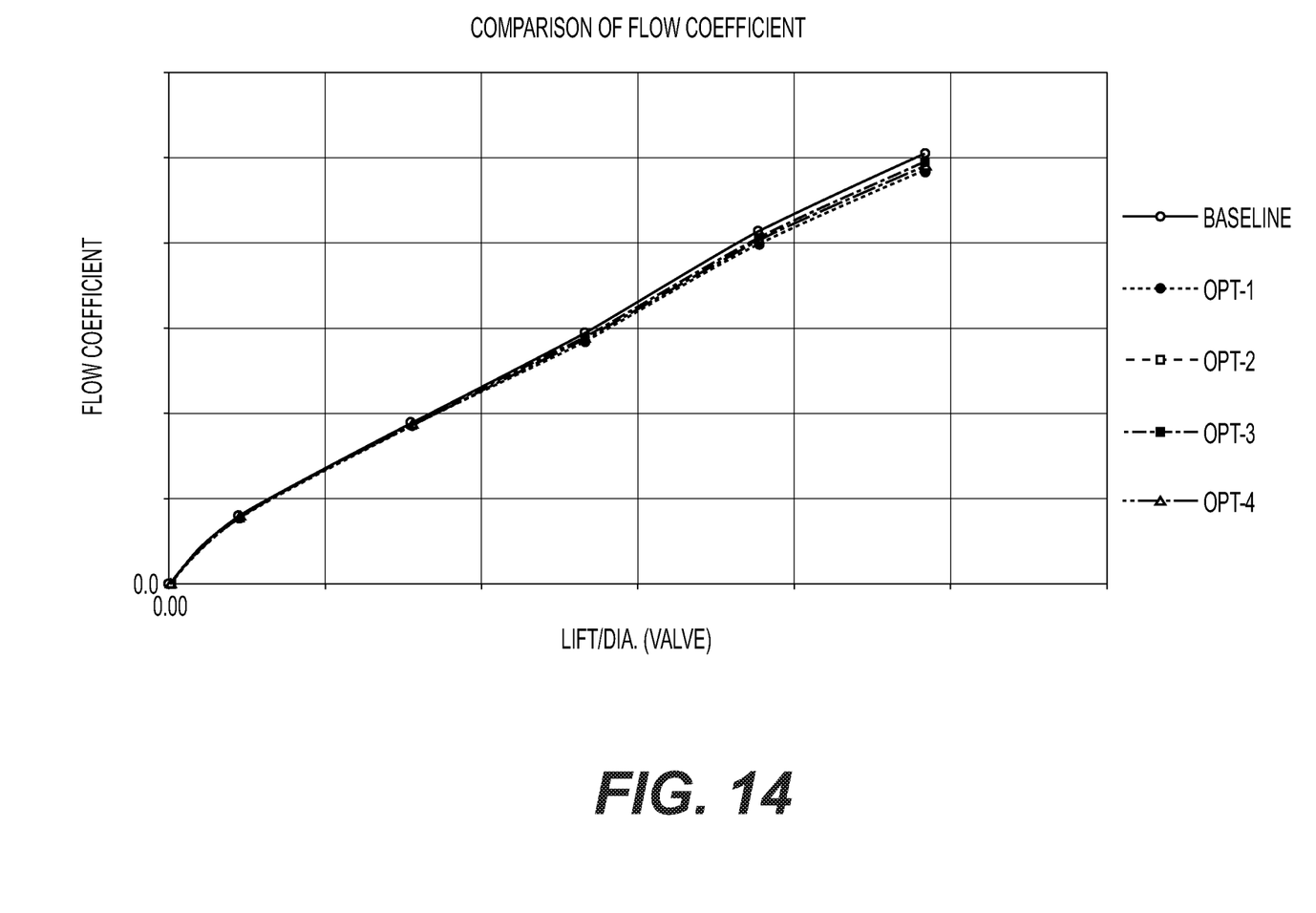
FIG. 14 is a graph of flow coefficient in comparison to valve lift/diameter for intake port designs according to the present disclosure such as those shown in FIGS. 3 thru 6, and a previous design.

Similarly, FIG. 14 shows a graph for an intake valve showing the flow coefficient is within 5% as compared to previous designs. This indicates that other engine performances involving fluid mechanics such as combustion have unexpectedly not been adversely impacted. This may be attributed to the venturi effect created by the new designs.

Figure 15:
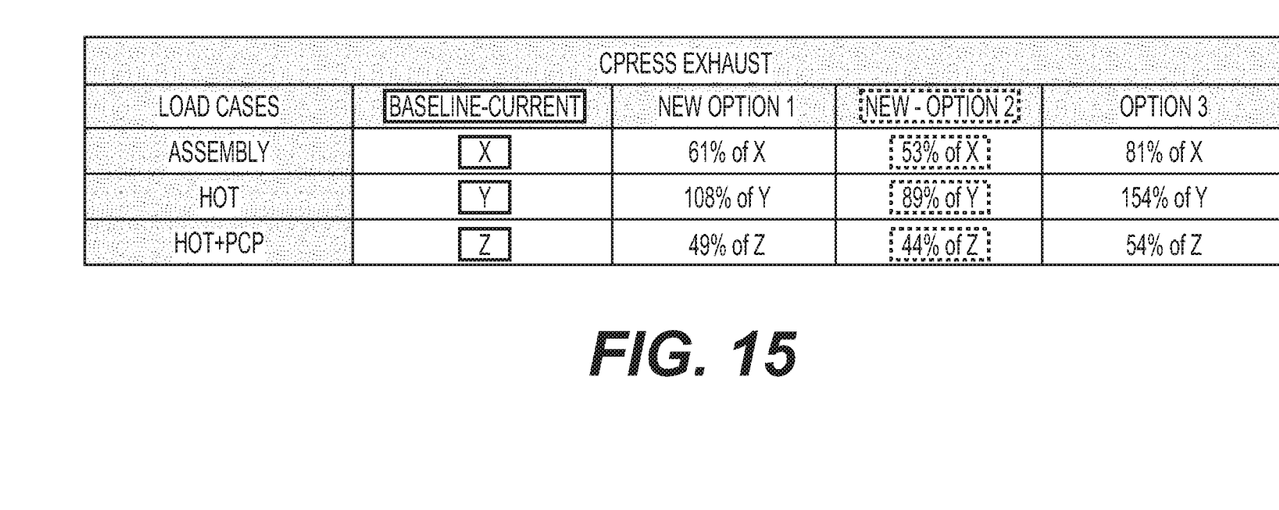
FIG. 15 is a comparative table of a valve seat insert in an engine head in proximity to an exhaust valve, according to various embodiments and principles of the present disclosure such as those shown FIGS. 7 thru 12, in comparison with a previous design to show reduced contact pressures.

Looking at FIG. 15, there is a comparative table showing how the embodiments (e.g. Options 1, 2 and 3) of the present disclosure for an exhaust valve have reduced the contact pressures (stresses) by as much as 40% or more compared to previous designs (Baseline). This may be due to increased contact area between the valve and the valve seat. So, one skilled in the art would expect that various embodiments of the present disclosure will have an improved longevity, necessitating less maintenance over the life of the engine.

Valve seat inserts can play a key role in engine performance and durability by way of wear performance for engine head life. Optimizing air flow at the same time as reducing wear has proven to be a great challenge. During operating an engine, intake valves reciprocate into and out of contact with a valve seat insert. Gases including air or air mixed with other gases such as recirculated exhaust gas or gaseous fuel, is typically supplied at a pressure greater than atmospheric pressure to the engine, such as from a turbocharger compressor. Downward travel of a piston in conjunction with the pressurization of the intake gases, causes the intake gases to rush into the cylinder as the piston moves from a top dead center position toward a bottom dead center position in an intake stroke so long as the intake valve is open.

According to the present disclosure, intake gases encountering top flow crown will tend to flow relatively smoothly past top flow crown and enter the venturi when a funnel surface is provided. The smooth and accelerating flow through the valve seat inserts of the present disclosure can compensate for, or more than compensate for, the reduced flow area as compared to the design of valve seat insert and other designs with sacrificing valve seat or valve performance or engine service life.

FIG. 14 shows that the intake port flow coefficient of various embodiments of the present disclosure is about the same as that of previous designs. So, one skilled in the art would not expect a degradation of the engine performance in terms of fluid mechanics, thermodynamics, emissions, etc. while also reducing the interval needed for maintaining the valve seat insert or the valve, etc. Thus, one skilled in the art may surmise that the compromise (tradeoff) between longevity and other engine performances has been broken using various embodiments of the present disclosure.

The wear crowns discussed herein, in conjunction with the valve seating contact widths, seat angles, valve angles, and other geometric features, are designed in a manner that can be understood as cushioning valve-valve seat impacts to reduce valve seat beat-in as well as slowing certain wear modes. Providing a valve seat geometry in line with such goals can improve over valve seat designs such as that used in valve seat insert 300, 400 but has been discovered to place certain limitations on the design of other valve seat insert characteristics such as gas flow properties.

Along such lines, the geometry of valve seat insert 300, 400 with respect to intake valve seating properties, and the geometry of valve seat insert 300, 400 with respect to intake gas flow properties can be understood as a system of cross-coupled variables where modifying one aspect of valve seat insert geometry can affect another aspect of valve seat insert geometry, often in unpredictable ways. For instance, providing second wear crown tends to require throat diameter to be reduced if valve seating diameter is to be maintained or increased. In the case of second wear crown too large a radius could impact flow area, acute angle, seat angle, or other parameters. Too small a radius could fail to provide desired flow patterns and/or compromise desired valve seating performance.

Incorporating top flow crown and positioning top flow crown so as to be set off from the engine head can further reduce available flow area over what might be obtained with a valve seat insert having no top flow crown and no set off from the engine head. If the radius forming a top flow crown is too small, for instance, the beneficial effects on incoming flow of intake gases might not be realized.

When a venturi is provided, then if the radius forming a top flow crown is too large, then the acute angle might be too narrow to achieve a desired acceleration of flow. Additional factors such as determining a suitable acute angle range, a seat angle range, whether a second flow crown is used, and still others can have similar effect. Where more than one design parameter is varied from design to design, the effects on performance can be still more complex and unpredictable. For these general reasons, it will be appreciated that the optimized designs and parametric guidelines of the present disclosure offer a practical balancing of factors bearing on valve seating and intake gas flow performance. In some cases, the compromise may actually be broken.

In summary, various embodiments of the present disclosure have novel seat geometry that lowers contact stress by as much as 45%, cuts the wear rate in half, lowers valve temperatures, and doubles the expected life of the valve seat insert. Cost is not increased since the amount of time necessary to manufacture the seats has not significantly changed.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," "include", "includes", "including", or the like are intended to be open-ended terms. Further, the phrase "based on" is intended to mean "based, at least in part, on" unless explicitly stated otherwise.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

Certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An engine head assembly for an internal combustion engine comprising: an engine head having a fluid conduit formed therein; a valve; a valve seat insert positioned at least partially within the engine head, and the valve seat insert including an at least partially annular body, defining a longitudinal axis, and a radial direction that is perpendicular to the longitudinal axis, a first axial end surface disposed proximate to the engine head, and a second axial end surface; a radially inner surface forming a throat, a radially outer peripheral surface, and a valve seating surface disposed axially and radially between the radially inner surface and the second axial end surface; and a top convex arcuate blend extending from the first axial end surface to the radially inner surface; wherein in a plane containing the longitudinal axis and the radial direction, the valve seating surface includes a radially outer convex arcuate segment defining an outer radius of curvature forming a first wear crown for contacting the valve at an early wear state, a radially inner convex arcuate segment defining an inner radius of curvature forming a second wear crown for contacting the valve at a later wear state, a linear segment extending between the radially outer convex arcuate segment and the radially inner convex arcuate segment, wherein a conical surface extending from the top convex arcuate blend to the throat, the conical surface being configured to form a venturi to accelerate an incoming flow of gases, and wherein the linear segment of the valve seating surface defines a break-in contact width that ranges from 4.0 millimeters to 5.0 millimeters.

2. The engine head assembly of claim 1 wherein the conical surface forms an acute angle with the longitudinal axis ranging from 0 degrees to 10.0 degrees.

3. The engine head assembly of claim 1 wherein the top convex arcuate blend forms a top flow crown having a top flow crown radius of curvature that ranges from 0.3 millimeters to 2.0 millimeters, the outer radius of curvature ranges from 1.5 millimeters to 6.0 millimeters, and the inner radius of curvature ranges from 0.2 millimeters to 0.6 millimeter.

4. The engine head assembly of claim 3 wherein the top flow crown is radially offset a radial distance from the engine head, and the top convex arcuate blend defines a top flow crown radius of curvature that is equal to or less than the radial distance.

5. The engine head assembly of claim 1 wherein the radially inner surface includes a cylindrical surface extending axially from the top convex arcuate blend to the radially inner convex arcuate segment.

6. The engine head assembly of claim 1 wherein the radially inner surface includes a cylindrical surface extending axially from the throat to the radially inner convex arcuate segment.

7. The engine head assembly of claim 1 further comprising a cylinder that is in fluid communication with the fluid conduit, a piston disposed in the cylinder that is configured to translate upwardly and downwardly in the cylinder, and the valve is disposed between the piston and the valve seat insert, the valve including an upwardly facing shut off surface that is configured to engage and disengage the valve seat insert.

8. The engine head assembly of claim 7 wherein the upwardly facing shut off surface is conical.

9. A valve seat insert for a valve in an internal combustion engine comprising: an annular body defining a valve seat cylindrical axis, and a radial direction that is perpendicular to the valve seat cylindrical axis, a first axial end surface, and a second axial end surface; the annular body further having a radially inner surface defining a throat, a radially outer peripheral surface, and a valve seating surface extending axially and radially between the radially inner surface and the second axial end surface; and a top convex arcuate blend extending from the first axial end surface to the radially inner surface; wherein the valve seating surface includes in a plane containing the valve seat cylindrical axis and the radial direction, a radially outer arcuate segment forming a first wear crown, a radially inner arcuate segment forming a second wear crown, a linear segment extending between the radially outer arcuate segment and the radially inner arcuate segment, wherein the radially inner surface includes in a plane containing the valve seat cylindrical axis and the radial direction, a sloping segment extending between the top convex arcuate blend and the throat, the sloping segment configured to form a venture to accelerate and incoming flow of gases, and wherein the linear segment of the valve seating surface defines a break-in contact width that ranges from 4.0 millimeters to 5.0 millimeters.

10. The valve seat insert of claim 9 wherein the radially inner surface includes in a plane containing the valve seat cylindrical axis and the radial direction, a vertical segment interposed axially between the throat and the second axial end surface.

11. The valve seat insert of claim 9 wherein the sloping segment extends radially outwardly from the throat toward the top convex arcuate blend at an acute angle of 3.00 or greater, relative to the valve seat cylindrical axis.

12. The valve seat insert of claim 9 wherein the top convex arcuate blend defines a top blend radius of curvature that ranges from 0.4 millimeters to 2.0 millimeters, the radially outer arcuate segment defines an outer radius of curvature that ranges from 1.5 millimeters to 6.0 millimeters, and the radially inner arcuate segment defines an inner radius of curvature that ranges from 0.2 millimeters to 0.6 millimeters, and the linear segment of the valve seating surface defines a break-in contact width that ranges from 4.0 millimeters to 5.0 millimeters.

13. A valve seat insert for a valve in an internal combustion engine comprising:
 an annular body defining a valve seat cylindrical axis, and a radial direction that is perpendicular to the valve seat cylindrical axis, a first axial end surface, and a second axial end surface;
 the annular body further having radially inner surface defining a throat, a radially outer peripheral surface, and a valve seating surface extending between the radially inner surface and the second axial end surface; and
 a top convex arcuate blend surface extending from the first axial end surface to the radially inner surface;
 wherein the valve seating surface includes in a plane containing the valve seat cylindrical axis and the radial direction, a radially outer convex arcuate segment forming a first wear crown, a radially inner convex arcuate segment forming a second wear crown, a linear segment extending axially and radially between the radially outer convex arcuate segment and the radially inner convex arcuate segment defining a break-in contact width that is greater than 3.9 millimeters, and the top convex arcuate blend surface defines a top radius of curvature that is greater than 0.3 millimeters.

14. The valve seat insert of claim 13 wherein the radially outer convex arcuate segment defines a radially outer convex radius of curvature that is greater than 1.9 millimeters, and the radially inner convex arcuate segment defines a radially inner convex radius of curvature that is greater than 0.2 millimeters.

15. The valve seat insert of claim 13 further comprising a vertical segment in the plane containing the valve seat cylindrical axis and the radial direction that extends from the top convex arcuate blend surface to the radially inner convex arcuate segment, defining a vertical length that ranges from 13.5 millimeters to 14.5 millimeters.

16. The valve seat insert of claim 13 wherein the throat defines a throat diameter that ranges from 78.0 millimeters to 79.6 millimeters.

17. The valve seat insert of claim 13 further comprising a vertical segment in the plane containing the valve seat cylindrical axis and the radial direction that extends from the throat to the radially inner convex arcuate segment, defining a vertical length that ranges from 2.0 millimeters to 3.0 millimeters, and a sloping segment that extends from the throat to the top convex arcuate blend surface.

* * * * *